United States Patent [19]

Close et al.

[11] Patent Number: 5,181,124
[45] Date of Patent: Jan. 19, 1993

[54] OPTICAL INTERMEDIATE PRODUCED BY A CALIBRATED PRINTER FOR USE IN AN ELECTROPHOTOGRAPHIC COPIER TO COMPENSATE FOR DETERMINABLE COPIER REPRODUCTION CHARACTERISTICS

[75] Inventors: Richard C. Close, Winchester; H. Scott Gregory, Jr., Bedford; Douglas G. Walker, Billerica, all of Mass.

[73] Assignee: Eastman Kodak Company, Rochester, N.Y.

[21] Appl. No.: 810,424

[22] Filed: Dec. 20, 1991

[51] Int. Cl.$^5$ ............... H04N 1/29; H04N 1/387; H04N 1/46; G03G 15/01
[52] U.S. Cl. ............................ 358/300; 358/75; 358/406; 355/208; 355/327; 346/157
[58] Field of Search ............ 358/75, 80, 300, 296, 358/302, 401, 406; 355/208, 326, 327, 32, 88; 346/157

[56] References Cited
U.S. PATENT DOCUMENTS 4,710,785 12/1987 Mills ............................ 358/300
4,779,106 10/1988 Mills ............................ 358/300

Primary Examiner—Benjamin R. Fuller
Assistant Examiner—Scott A. Rogers
Attorney, Agent, or Firm—Evenson, Wands, Edwards, Lenahan & Mckeown

[57] ABSTRACT

An arrangement for producing electrophotographic reproductions of an original image, including a source of digitized data that digitally represents an original image, a photocopier having determinable reproduction characteristics and which produces electrophotographic reproductions, and a printer. The printer is coupled to the source that receives the digitized data and produces an optical intermediate from the digitized data. This optical intermediate compensates for the determinable reproduction characteristics of the photocopier and of the scanner such that photocopying of the optical intermediate by the photocopier produces an accurate electrophotographic reproduction of the original image. The printer is provided with a composite device function table that relates target image pixel values used by the printer to measured color data of the output of the photocopier.

17 Claims, 1 Drawing Sheet

OPTICAL INTERMEDIATE PRODUCED BY A CALIBRATED PRINTER FOR USE IN AN ELECTROPHOTOGRAPHIC COPIER TO COMPENSATE FOR DETERMINABLE COPIER REPRODUCTION CHARACTERISTICS

FIELD OF THE INVENTION

The present invention relates to the field of image processing, and more particularly, to the low-cost multiple image reproduction of an original image.

BACKGROUND OF THE INVENTION

Color reproduction of a color original on low-cost color photocopiers is generally of poor quality. The contrast of the imaging process of low-cost color photocopiers (and of electrophotographic processes in general) is very high. This can be due to the use of a continuous tone reproduction instead of a halftone or dither reproduction.

The poor color reproduction quality of low-cost color photocopiers presents a problem to someone who needs low-cost multiple reproductions of an original color image. Direct photocopying of the original image produces photocopies of poor quality. A single printer, such as the XL7700 printer manufactured by Kodak, will produce a high-quality reproduction, but the time needed to produce just one reproduction is relatively long in comparison to known electrophotographic processes.

In other fields of endeavor, such as in the motion picture industry, the concept of "optical intermediates" is used to produce a final product. A motion picture camera negative could be printed directly onto the print material in a single step. However, intermediate films are used to produce a duplicate negative which is used to expose the final prints. This is necessary because the original negative is not durable enough and is too valuable to use for the production of the numerous prints needed for distribution. These intermediate stages allow for the addition of special effects and titles, but are not generally used for improving the color reproduction of the final print.

There is a need for a device and a method that provides low-cost multiple color image reproductions of an original image by using the concept of optical intermediates.

SUMMARY OF THE INVENTION

This and other needs are met by the present invention which provides a method of producing an electrophotographic reproduction of an original image, comprising the steps of generating an optical intermediate of an original image, and photocopying this optical intermediate to produce a photocopy, where the optical intermediate is generated such that the original image is altered on the optical intermediate to compensate for reproduction error introduced in the step of photocopying.

Another embodiment of the present invention provides a method of producing photocopies of an original image, comprising the steps of providing a composite device function table to a printer, this composite device function table relating target image pixel values to desired photocopy output colors. Target image pixel values are provided as the input to the printer. An optical intermediate is generated with the printer, this optical intermediate being generated from the target image pixel values according to the composite device function table. The optical intermediate is then photocopied to produce a photocopy.

Another embodiment of the present invention provides an arrangement for producing electrophotographic reproductions of an original image, and includes a source of digitized data that digitally represents an original image, a photocopier having determinable reproduction characteristics and which produces electrophotographic reproductions, and a printer. The printer is coupled to the source that receives the digitized data and produces an optical intermediate from the digitized data. This optical intermediate compensates for the determinable reproduction characteristics of the photocopier such that photocopying of the optical intermediate by the photocopier produces an accurate electrophotographic reproduction of the original image.

Another embodiment of the present invention provides an arrangement for providing multiple photocopies of an original image, and comprises means for photocopying, said means for photocopying having determinable reproduction characteristics; and means for producing an optical intermediate representing the original image in a manner which compensates for the determinable reproduction characteristics of the means for photocopying.

Another embodiment of the present invention provides a device for producing an optical intermediate of an original image which causes a photocopier to accurately reproduce the original image upon photocopying of the optical intermediate. This device includes means for receiving digital data representing the original image, and means for producing an optical intermediate from the received digital data according to a relationship between input to the means for producing an optical intermediate and output of a photocopier, such that the optical intermediate compensates for reproduction characteristics of the photocopier.

Some of the advantages of the above described embodiment of the present invention include the low-cost, rapid reproduction of original images, in a manner that accurately reproduces these images. This is accomplished by the production of a single optical intermediate that compensates for the determinable reproduction characteristics of the low-cost printer, as well as for the characteristics of the printer itself. Thus, the photocopies produced from the photocopier of the optical intermediate will more accurately reproduce the original image than would direct photocopies of the original image itself. Using the present invention, multiple accurate reproductions of a digitized color image can be much more rapidly produced than with a standard printer that accepts digital data.

Other objects, advantages and novel features of the present invention will become apparent from the following detailed description of the invention when considered in conjunction with the accompanying drawings.

DETAILED DESCRIPTION OF THE DRAWINGS

Figure 1:
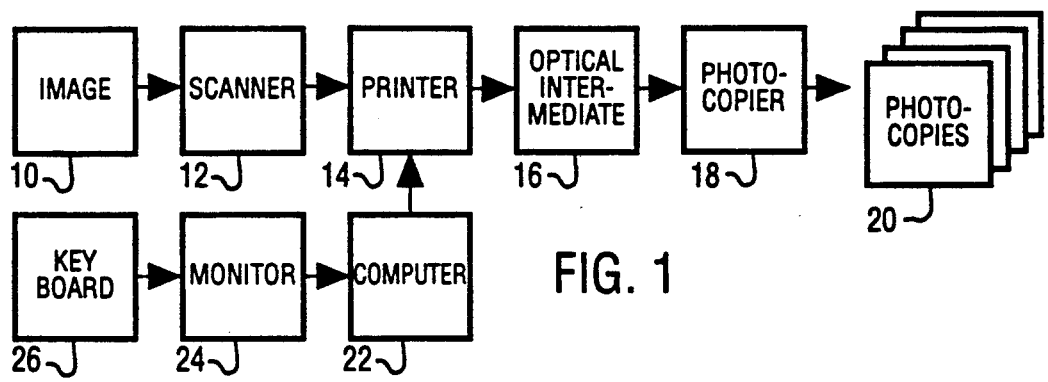
FIG. 1 is a block diagram of an arrangement to provide multiple color image reproductions, constructed in accordance with an embodiment of the present invention.

A block diagram of an arrangement to provide multiple color image reproductions, constructed in accordance with an embodiment of the present invention, is illustrated in FIG. 1. The individual components of the arrangement are shown in block diagram form since these components are conventional. In the following description, color images are used as an example. The present invention also finds use with other types of images, such as black and white images.

An image 10, such as a color photograph, or a transparency, is scanned by a digitizer/scanner 12 to digitize the image 10 into image pixel values that digitally represent the image. A suitable scanner is the Colorgetter scanner, manufactured by Optronics. Once the image 10 has been digitized, a high resolution printer 14 prints a single optical intermediate 16 using values functionally related to the image pixel values of the image 10. The relationship of the image on the optical intermediate 16 to the original image 10 will be discussed later. A suitable printer 14 for producing the optical intermediate 16 is the XL7700 printer, manufactured by Kodak.

The optical intermediate 16 is placed on a color photocopier 18, such as the PrismI copier, manufactured by Savin. A large number of color image reproductions 20 (i.e., photocopies), can then be rapidly produced by the photocopier 18.

A conventional computer 22 is coupled to the printer 14 to control the manipulation of the image pixel values so that an appropriate optical intermediate 16 will be produced. Alternatively the scanner 12 can be customized to a particular photocopier 18, so that a computer 22 would not be necessary. A monitor 24 and keyboard 26 are coupled to the computer 22, so that an image can be manipulated by the computer 22 at the direction of a user. Furthermore, a digitized image can be provided by the computer 22 directly to the printer 14 for producing the optical intermediate 16. Other sources of digitized images can provide input to the printer 14, as long as the relationship between the original image pixel values and the final image (i.e., the photocopy 20) is known, as will be explained below.

Recognizing that low-cost color photocopiers produce relatively poor image reproductions (too high in contrast, for example), the optical intermediate 16 produced in the present invention does not attempt to accurately reproduce the image 10. Instead, the optical intermediate 16 has its colors altered in such a manner that when it is reproduced by the photocopier 18, the reproduction (photocopy 20) will more accurately reproduce the original image 10. The photocopy 20 of the optical intermediate 16 will thus be a more accurate reproduction of the original image 10 than would a direct photocopy of the original image 10.

For example, the image for the optical intermediate 16 will be altered to be very low in contrast and have odd looking (to the human eye) color reproduction. However, when the photocopier 18 reproduces the optical intermediate 16, the reproduction will be higher in contrast and the colors will look more like those of the original image 10.

Figure 2:
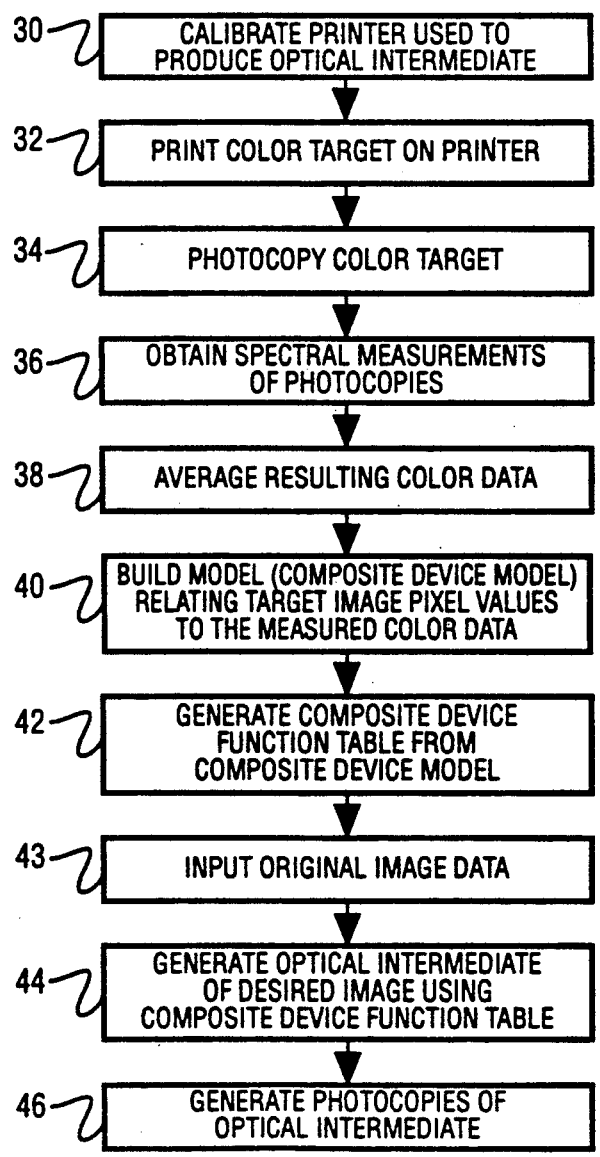
FIG. 2 illustrates a flow chart of an embodiment of the method of the present invention.

The generation of the optical intermediate image 16 uses known color technology. A method of producing the color calibrated photocopies 20 now follows, with reference to FIG. 2. In step 30, the printer 14 that is used to produce the optical intermediate 16 is calibrated in a known manner, such as described in U.S. Pat. No. 4,658,286, to Schreiber. Basically, image pixel code values representing a number of desired color patches are provided to the printer in a device code space. The printer 14 produces a print from these code values. The colors of the patches are measured with standard colorimetry, and a device model is formed that relates the input code values to the colors that are actually output by the printer 14 from these code values. The model is inverted so that a desired color can be produced by the input of a proper code value to the printer 14. This is a well-known process.

A color target (not illustrated) with known image pixel values is printed by the printer 14 in step 32. This color target is then photocopied by photocopier 18 to produce photocopies of the color target in step 34. In step 36, spectral measurements of the photocopies 20 are obtained, and the resulting color data is averaged in step 38.

In step 40 another model is created that relates the known image pixel values of the target to the color data that was measured and averaged in steps 36 and 38. This model is a composite device model, since it relates the image pixel values that are input to a first device (i.e. the printer 14) to the output color data of a second device (i.e. the photocopier 18). The first and second devices can thus be considered a "composite" device.

From the composite device model created in step 40, a "composite device" function table is generated in step 42. Although described as a composite device function table, it is to be understood that this term can mean two or more function tables (one for each device) or a single table that has been composed by known methods from the individual tables. This function table is used by the printer 14 in place of its own function table in step 44 to make an optical intermediate 16 of an original image 10 that has been input to the printer 14 in step 43. This input is in the form of pixel values and can originate from any number of different sources, such as a scanner output or a direct computer output.

The optical intermediate 16 of the original image 10 is then used in step 46 to generate photocopies 20 that accurately reproduce the original image 10.

As discussed earlier, the present invention is not limited to requiring the original images 10 to be "color" images. For example, black and white photographs will be more accurately reproduced by the present invention than they would be by merely photocopying the black and white photograph itself.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of producing an electrophotographic reproduction of an original image, comprising the steps:
   generating an optical intermediate of an original image; and
   photocopying said optical intermediate to produce a photocopy;
   wherein said optical intermediate is generated such that the original image is altered on said optical intermediate to compensate for reproduction error introduced in the step of photocopying.

2. A method of producing photocopies of an original image, comprising the steps:

providing a composite device function table to a printer, said composite device function table relating target image pixel values to desired photocopy output colors;

providing target image pixel values as input to said printer;

generating an optical intermediate with said printer, said optical intermediate being generated from said target image pixel values according to said composite device function table; and photocopying said optical intermediate to produce a photocopy.

3. The method of claim 2, wherein the step of providing a composite device function table includes the step of building a composite device model relating target image pixel values to the desired photocopy output colors.

4. The method of claim 3, further including the steps of:

calibrating the printer;

printing a color target from known image pixel values using the printer;

photocopying the color target; and obtaining spectral measurements of the photocopy, with the spectral measurements and the known image pixel values are used in the step of building a composite device model.

5. An arrangement for producing electrophotographic reproductions of an original image, comprising:

a source of digitized data that digitally represents an original image;

a photocopier having determinable reproduction characteristics and which produces electrophotographic reproductions; and a printer coupled to the source that receives the digitized data and produces an optical intermediate from the digitized data, said optical intermediate compensating for the determinable reproduction characteristics of the photocopier such that photocopying of the optical intermediate by the photocopier produces an accurate electrophotographic reproduction of the original image.

6. The arrangement of claim 5, further comprising means for determining the determinable reproduction characteristics of the photocopier.

7. The arrangement of claim 6, further comprising means for generating a composite device function table that relates image pixel values to photocopier output characteristics, said composite device function table being provided to said printer to control the production of the optical intermediate.

8. The arrangement of claim 6, wherein the photocopier is a color photocopier.

9. The arrangement of claim 6, wherein the source is a digitizing scanner.

10. The arrangement of claim 6, wherein the source is a computer.

11. An arrangement for providing multiple photocopies of an original image, comprising:

means for photocopying having determinable reproduction characteristics; and means for producing an optical intermediate representing the original image in a manner which compensates for the determinable reproduction characteristics of the means for photocopying.

12. The arrangement of claim 11, further comprising means for determining the reproduction characteristics of the photocopier.

13. The arrangement of claim 11, wherein the means for producing an optical intermediate include means for producing a composite device function table relating input to the means for producing the optical intermediate to output of the photocopier.

14. The arrangement of claim 11, further comprising means for providing digital data representing the original image as input to the means for producing an optical intermediate.

15. The arrangement of claim 14, wherein the digital date is colormetrically accurate.

16. The arrangement of claim 14, wherein the means for providing digital data is a digitizing scanner.

17. A device for providing an optical intermediate of an original image which causes a photocopier to accurately reproduce the original image upon photocopying of the optical intermediate, comprising:

means for receiving digital data representing the original image; and means for producing an optical intermediate from the received digital data according to a relationship between input to the means for producing an optical intermediate and output of a photocopier, such that the optical intermediate compensates for reproduction characteristics of the photocopier.

* * * * *